US009647907B1

(12) United States Patent
Guilfoyle

(10) Patent No.: US 9,647,907 B1
(45) Date of Patent: *May 9, 2017

(54) SYSTEM, METHOD, AND COMPUTER-READABLE MEDIUM FOR DIAGNOSING A CONFERENCE CALL

(71) Applicant: West Corporation, Omaha, NE (US)

(72) Inventor: Jeffrey J. Guilfoyle, Omaha, NE (US)

(73) Assignee: West Corporation, Omaha, NE (US)

( * ) Notice: Subject to any disclaimer, the term of this patent is extended or adjusted under 35 U.S.C. 154(b) by 296 days.

This patent is subject to a terminal disclaimer.

(21) Appl. No.: 14/196,733

(22) Filed: Mar. 4, 2014

Related U.S. Application Data

(63) Continuation of application No. 11/765,503, filed on Jun. 20, 2007, now Pat. No. 8,675,853.

(51) Int. Cl.
*H04L 12/28* (2006.01)
*H04L 12/26* (2006.01)
*H04M 3/22* (2006.01)
*H04M 3/56* (2006.01)

(52) U.S. Cl.
CPC .......... *H04L 43/04* (2013.01); *H04M 3/2281* (2013.01); *H04M 3/561* (2013.01)

(58) Field of Classification Search
USPC ........................................ 370/260, 261, 266
See application file for complete search history.

(56) References Cited

U.S. PATENT DOCUMENTS

| 5,675,511 | A | 10/1997 | Prasad et al. |
| 5,930,698 | A * | 7/1999 | Bertacchi ............... H04L 63/30 |
| | | | 379/202.01 |
| 6,259,677 | B1 | 7/2001 | Jain |
| 6,466,550 | B1 | 10/2002 | Foster et al. |
| 6,522,633 | B1 | 2/2003 | Strawczynski |
| 6,574,469 | B1 | 6/2003 | Xiang et al. |
| 6,671,262 | B1 | 12/2003 | Kung et al. |
| 6,728,345 | B2 | 4/2004 | Glowny et al. |
| 6,744,757 | B1 | 6/2004 | Anandakumar et al. |
| 6,826,708 | B1 | 11/2004 | Michalewicz |
| 6,850,496 | B1 | 2/2005 | Knappe et al. |
| 6,985,445 | B1 | 1/2006 | Hao et al. |
| 8,121,277 | B2 | 2/2012 | Baird |
| 2001/0002927 | A1 | 6/2001 | Detampel et al. |
| 2001/0038610 | A1 | 11/2001 | Decker et al. |
| 2002/0167936 | A1 | 11/2002 | Goodman |
| 2002/0167937 | A1 | 11/2002 | Goodman |
| 2002/0174216 | A1 | 11/2002 | Shorey et al. |
| 2003/0002448 | A1 | 1/2003 | Laursen et al. |
| 2003/0145054 | A1 | 7/2003 | Dyke |
| 2004/0196867 | A1 | 10/2004 | Ejzak et al. |
| 2004/0252700 | A1 | 12/2004 | Anandakumar et al. |
| 2004/0252821 | A1 | 12/2004 | Chiczewski et al. |
| 2005/0094622 | A1 | 5/2005 | Mallila |

(Continued)

*Primary Examiner* — Zewdu A Beyen
(74) *Attorney, Agent, or Firm* — Raffi Gostanian

(57) ABSTRACT

A system, method, and computer readable medium that facilitate diagnosing a conference call are provided. A tap is deployed at the ingress side and the egress side of one or more processing systems that handle each leg of a conference. When a conference is disrupted by noise, loss, or the like, an operator may initiate a command to systemically record each leg of the conference for a predetermined period of time. Each leg may then be analyzed to determine if it is the source of the disruption.

4 Claims, 4 Drawing Sheets

(56) References Cited

U.S. PATENT DOCUMENTS

2005/0233736 A1    10/2005   Berstis et al.
2006/0031469 A1    2/2006   Clarke et al.
2006/0062367 A1    3/2006   Christenson et al.
2006/0126538 A1    6/2006   Krstulich
2007/0198637 A1    8/2007   Deboy et al.
2008/0137558 A1    6/2008   Baird \* cited by examiner

SYSTEM, METHOD, AND COMPUTER-READABLE MEDIUM FOR DIAGNOSING A CONFERENCE CALL

CROSS-REFERENCE TO RELATED APPLICATIONS

This application is a continuation from U.S. patent application Ser. No. 11/765,503, filed Jun. 20, 2007, and entitled "SYSTEM, METHOD, AND COMPUTER-READABLE MEDIUM FOR DIAGNOSING A CONFERENCE CALL", which is incorporated by reference herein in its entirety.

FIELD OF THE INVENTION

The present invention is generally related to call conferencing technologies and, more particularly, to mechanisms for diagnosing a conference call.

BACKGROUND OF THE INVENTION

Many businesses and individuals are using voice over Internet protocol (VoIP) as their primary telephony service. As a result, various services as previously provided in circuit-switched telephony are now implemented for VoIP-based telephony. One such service is conferencing. As is known in the art, conferencing is provided by a conference platform that receives a plurality of audio streams from the conference participants, mixes these streams and transmits the mixed audio streams back to the participants. A problem in the art is that VoIP-based conference audio is subject to the same disruptive problems as is circuit-switched conferencing (e.g., static, loss, echo, etc.). However, in VoIP conferencing, there are no automated tools to help diagnose problems. Currently, an operator must work with every stream or "leg" of the conference until the problem is located. Often, operator assisted conference diagnostics in IP-based systems is time consuming and intrusive.

Therefore, what is needed is a mechanism that overcomes the described problems and limitations.

SUMMARY OF THE INVENTION

The present invention provides a system, method, and computer readable medium for isolating audio quality issues on an IP-based conferencing platform. In accordance with an exemplary embodiment of this invention, a tap is provided at the ingress side and the egress side of each processing system that handles each leg of a conference. When a conference is disrupted by noise, loss, or the like, an operator may initiate a command to systemically record each leg of the conference for a predetermined period of time. Each leg may then be analyzed to determine if it is the source of the disruption. Advantageously, each recorded leg of the conference is transformed into an audible signal before it is analyzed. The quality of the audible signals at the ingress and egress sides of each processing system may be compared. If the problem cannot be isolated in this manner, then the audible signals can be easily transferred and analyzed by engineers. In this manner, a disruptive leg or legs of a conference call may be diagnosed and corrected in a cost-effective, minimally disruptive manner.

In one embodiment of the disclosure, a method for diagnosing a conference call is provided. The method includes deploying taps at ingress and egress ports of a telecommunications node adapted to aggregate conference legs, interfacing a recording system adapted to record audio content captured at the ingress and egress ports, capturing, in response to receipt of a record command, the conference legs aggregated by the node, and providing audio files comprising the captured conference legs to a conference system provider.

In another embodiment of the disclosure, a computer-readable medium having computer-executable instructions for execution by a processing system, the computer-executable instructions for diagnosing a conference call, the computer-readable medium comprising instructions for tapping ingress and egress ports of a telecommunications node adapted to aggregate conference legs, communicatively interfacing a recording system adapted to record audio content captured at the ingress and egress ports, capturing, in response to receipt of a record command, the conference legs aggregated by the node, and providing audio files comprising the captured conference legs to a conference system provider.

In a further embodiment of the disclosure, a system for diagnosing a conference call is provided. The system comprises a plurality of terminal devices adapted to participate in a conference call, a node adapted to terminate a conference leg with each of the plurality of terminal devices at a respective port of the node, a respective tap deployed inline with each port terminating a conference leg, and a recording device adapted to capture audio content from each respective tap, wherein the recording device begins capturing audio content in response to receipt of a command from a conference service provider operator.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with embodiments, deficiencies exhibited in contemporary VoIP teleconference systems are resolved and a technical advance is achieved by a mechanism that isolates audio quality issues on an IP-based conferencing platform. In accordance with an exemplary embodiment of this invention, a tap is provided at the ingress side and the egress side of each processing system that handles each leg of a conference. When a conference is disrupted by noise, loss, etc., an operator initiates a command to systemically record each leg of the conference for a predetermined period of time. Each leg is then analyzed to determine if it is the source of the disruption. Advantageously, each recorded leg of the conference is transformed into an audible signal before it is analyzed. The quality of the audible signals at the ingress and egress sides of each processing system is compared. If the problem cannot be isolated in this manner, then the audible signals can be easily transferred and analyzed by engineers. In this manner, a disruptive leg or legs of a conference call may be diagnosed and corrected in a cost-effective, minimally disruptive manner.

Figure 1:
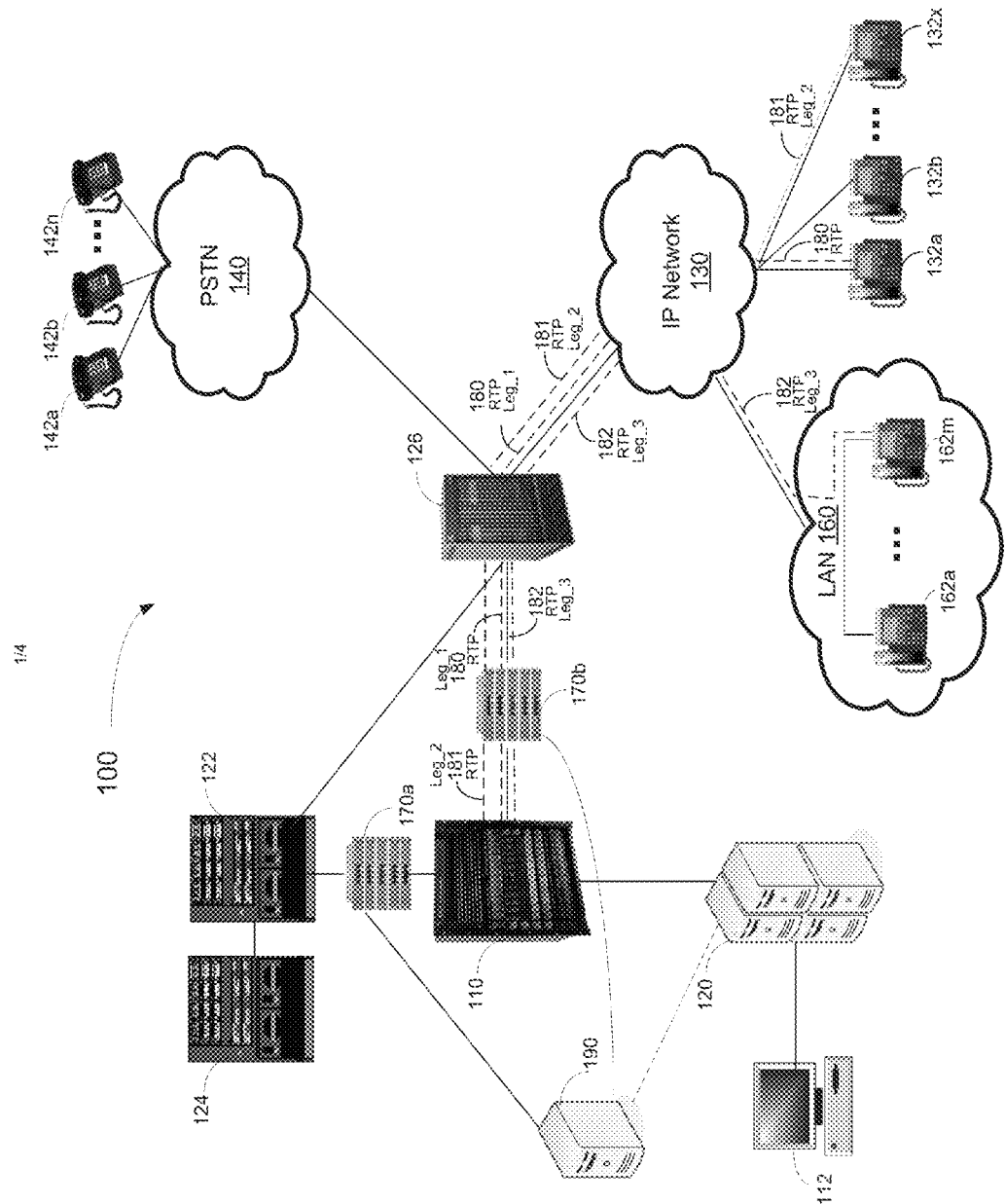
FIG. 1 is a diagrammatic representation of a network system featuring a teleconferencing system in which embodiments of the present invention may be implemented to facilitate conferencing diagnostics.

FIG. 1 is a diagrammatic representation of a network system 100 featuring a teleconferencing system in which embodiments of the present invention may be implemented to facilitate conferencing diagnostics. FIG. 1 is intended as an example, and not as an architectural limitation, of a network system in which embodiments described herein may be deployed, and embodiments disclosed herein may be implemented in any variety of network systems in which VoIP devices and transmissions may be implemented.

Network system 100 includes a media server 110 that may operate in conjunction with an application server 120. Media server 110 may process, manage, and provide appropriate resources to application server 120. Media server 110 may include call and media processing functionality, for example, speech recognition, audio bridging, voice and media processing and merging, and the like. Media server 110 may function as a call aggregation point through which all call conferencing legs of various conference calls supported in system 100 are routed and processed. Additionally, media server 110 may process audio content for voice over Internet Protocol (VoIP) transmission via an IP network 130. To this end, media server 110 may provide real time transport (RTP) of audio or video. Application server 120 may provide instructions to media server 110 on how to carry out specified services, such as audio conferencing instructions. Network switches 122 and 124 provide the transport mechanism for these devices.

Media server 110 and application server 120 may interface with a media gateway 126. Media server 110 may interface with an IP network 130 or the public switched telephone network 140, e.g., via a time division multiplexed (TDM) and media gateway 126 that may be deployed, for example, in a carrier network. Media gateway 126 may connect different media stream types to create and end-to-end media path. Accordingly, media server 110 and application server 120 may function to provide call conferencing services to packet-switched telephony devices, such as IP telephones 162a-162m deployed in, for example, a local area network 160, IP devices 132a-132x connected with IP network 130 via, for example, digital subscriber line access modules at a carrier central office, and analog telephones 142a-142n interconnected with PSTN 140.

In accordance with an embodiment, taps 170a-170b (collectively referred to as taps 170) may be deployed in system 100 that facilitate capturing conferencing legs for analysis thereof. Taps 170 comprise physical network taps preferably deployed on each interface of a conferencing aggregation node, e.g., media server 110. In an embodiment, taps 170 are deployed at each ingress and egress port through which real-time transport (RTP) or other VoIP data may be received or transmitted by media server 110, that is at ports both receiving incoming RTP content from conference participant devices and ports transmitting RTP content to conference participant devices.

Taps 170 may comprise, for example, Gigabit Ethernet devices that are placed inline on the Ethernet connection between media server 170 and network switch facilities, e.g., media gateway 122 or switch 126. Preferably, each Ethernet port of media server 110 capable of streaming RTP will be tapped, including backup ports, and each tap will preferably have separate redundant power supplies to minimize the risk of failure of these components. While these devices are very reliable, steps may be taken to determine if a failure occurs to assist in isolating potential problems.

Each network connection from media server 110 may require two Gigabit Ethernet ports. This will minimize the potential for dropped packets, as each Gigabit stream will have a dedicated network interface card (NIC) on the server. The number of connections from these devices will determine the number of servers required to support the packet capture function.

A conferencing application run by application server 120 may facilitate recording conference legs in accordance with an embodiment. The conferencing application may respond to a record request to initiate a recording session from a conferencing service provider operator console 112 that is communicatively interfaced with application server 120. To this end, the conferencing application may send a request to a recording server 190 that is communicatively interfaced with taps 170 to begin the recording process. The record request may include necessary information, e.g., unique conference identifier, unique call leg identifiers, and source and destination IP address and ports for each conference leg, to isolate each RTP stream involved in the conference for which the conference legs are to be recorded. Additionally, the conferencing application may be configured to play a message on the conference bridge to indicate to conference participants a starting and stopping of the recording.

Recording server 190 runs a network traffic analyzer application adapted to capture packets off the wire and decode any variety of captured protocols. In accordance with an embodiment, the traffic analyzer run by server 190 is configured to capture individual legs of a conference call. To properly record only the necessary packets, a single traffic capture session may be launched for each conference leg on each necessary interface. The necessary interfaces may be identified based on the source and destination IP addresses obtained from the application server 120.

When the recording has completed, the captured RTP packets may be converted to .wav files or other suitable audio format using available tools (e.g., ethereal, VoiPong, or other suitable application). Analysis of the captured files may be performed to identify any jitter, loss, and latency. Additionally, these files may be made available to the conference service provider for analysis thereby. For example, the audio files each comprising the audio content of a conference leg may be made available through a web site, and a hyperlink to the conference leg audio files may be transmitted to conference service provider personnel.

In the present example, assume a three-way conference is set up for IP phone 132a, 132x, and 162m. Thus, each conference participant has a respective conference leg 180-182 (illustratively represented with dashed lines) established therefor. In the present example, media server 110 may provide conferencing functions, such as bridging, and thus legs 180-182 may terminate with media server 110. Particularly, legs 180-182 may comprise RTP streams terminated by the conference participant devices 132a, 132x, and 162m and media server 110. It is understood that each conference leg 180-182 may comprise two media streams—one inbound to each participant device that comprises the bridged conference audio, and one outbound from the participant devices comprising the corresponding participant audio input supplied to media server 110 for bridging. Legs may be routed through other network devices, such as media gateway 122, for media translation, and the depicted example of conference legs 180-182 is simplified to facilitate an understanding of embodiments disclosed herein.

Figures 2, 3:
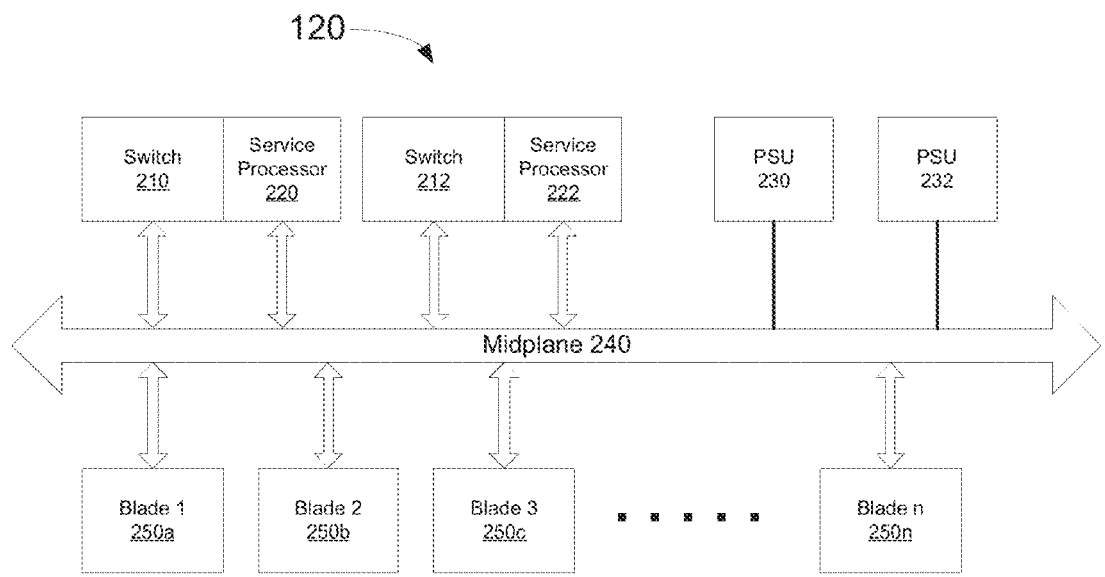
FIG. 2 is a diagrammatic representation of an exemplary embodiment of an application server depicted in FIG. 1.
FIG. 3 is a diagrammatic representation of a table that may be managed by an application server that facilitates conferencing services that may be diagnosed in accordance with an embodiment.

FIG. 2 is a diagrammatic representation of an exemplary embodiment of an application server 120 depicted in FIG. 1. Code or instructions facilitating conference diagnostics implemented in accordance with an embodiment of the present invention may be maintained by or accessed by server 120.

Server 120 may be implemented as a Blade server system featuring one or more switching modules 210-212 and associated service processors 220-222 adapted to perform various non-core computing services. Switching modules 210-212 and service processors 220-222 may be coupled with a midplane interconnect 240 deployed in the server chassis. Redundant power supply may be provided by power supply units 230-232 that provide power for all blades in server 120.

A plurality of self-contained servers implemented as blades 250a-250n may be connected with backplane interconnect 240. Blades 250a-250n may feature respective hard drives, memory systems, processors, and the like for implementing self-contained server system. Blades, switches, and the service processors may run management agents, and blades may be assigned IP addresses, host names, and network resource names and a host ID to facilitate management of the blade network as is known.

An operating system may run on processor systems of blades 250a-250n and may be used to coordinate and provide control of various components within the respective server systems. Instructions for the operating system and applications or programs are located on storage devices, such as hard disk drives, and may be loaded into memory systems for execution by associated processor systems.

Those of ordinary skill in the art will appreciate that the hardware depicted in FIG. 2 may vary. The depicted example is not intended to imply architectural limitations with respect to implementations of the present disclosure, but rather embodiments disclosed herein may be run by any suitable data processing system. In other implementations, application server 120 may be implemented as multi-processor server system such as a symmetric multi-processor system, a server farm, or any other suitable data processing system.

FIG. 3 is a diagrammatic representation of a conferencing table 300 that may be managed by application server 120 that facilitates conferencing services that may be diagnosed in accordance with an embodiment. Table 300 comprises a plurality of records 310 and fields 320. Table 300 may be stored on a disk drive, such as a disk drive of a blade in server 120, fetched therefrom by a processor, and processed thereby.

Each record 310a-310c, or row, comprises data elements in respective fields 320a-320f. Fields 320a-320f have a respective label, or identifier, that facilitates insertion, deletion, querying, or other data operations or manipulations of table 300. In the illustrative example, fields 320a-320f have respective labels of "Conference ID", "Call Leg ID", "Source IP", "Source Port", "Destination IP", and "Destination Port".

In the present example, assume records 310a-310c are allocated for the conference call depicted in FIG. 1 that comprises three conference participants. Conference ID field 320 stores data elements that specify a unique ID (illustratively designated "Conference_A") assigned to the conference call. A conference ID may, for example, comprise a numerical tag assigned to a conference. Call leg ID field 320b stores data elements that specify an identifier of a particular call leg in respective records 310a-310c. In the present example, call leg ID field 320b specifies that call legs 180-182 (illustratively designated "Leg_1"-"Leg_3") are each allocated for the conference specified in field 320a of respective records 310a-310c. Source IP field 320c stores data elements, such as IPv4 addressees (illustratively designated "IP-1"-"IP-3"), that specify an IP address of a call participate, e.g., an IP address assigned to conference participant devices 132a, 132x, and 162m. Likewise, source port field 320d stores data elements that specify a port (illustratively designated "Port-1"-"Port-3") allocated at the conference participant device for the associated conference leg. Destination IP field 320e and destination port field 320f store data elements that specify a destination IP address (illustratively designated "IP-4"-"IP-6") and port (illustratively designated "Port-4"-"Port-6") of the call leg associated with record 310a-310c. For example, destination IP field 320e and destination port field 320f may store IP addresses and ports of media server 110 that terminates call legs 180-182.

Figure 4:
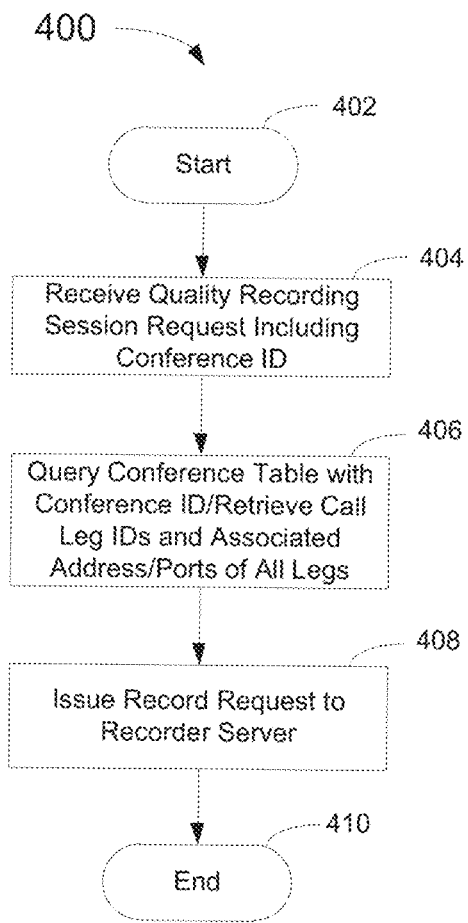
FIG. 4 is a flowchart depicting processing of an application server routine that facilitates conferencing diagnostics in accordance with an embodiment of the invention.

FIG. 4 is a flowchart depicting processing of an application server routine that facilitates conferencing diagnostics in accordance with an embodiment of the invention. The processing steps of FIG. 4 may be implemented as computer-executable instructions executable by a processing system, such as application server 120. The routine is invoked (step 402), and the application server receives a record request from a conference service provider operator, e.g., operator console 112, for a quality recording session (step 404). The record request may include a unique conference ID assigned to a particular conference session. Application server 120 may then interrogate conference table 300 with the conference ID and retrieve call leg IDs and associated source and destination IP address and ports therefrom (step 406). A record request including the source and destination addresses and ports of each call leg may then be issued by application server 120 to recording server 190 (step 408). The application server routine cycle may then end (step 410).

Figure 5:
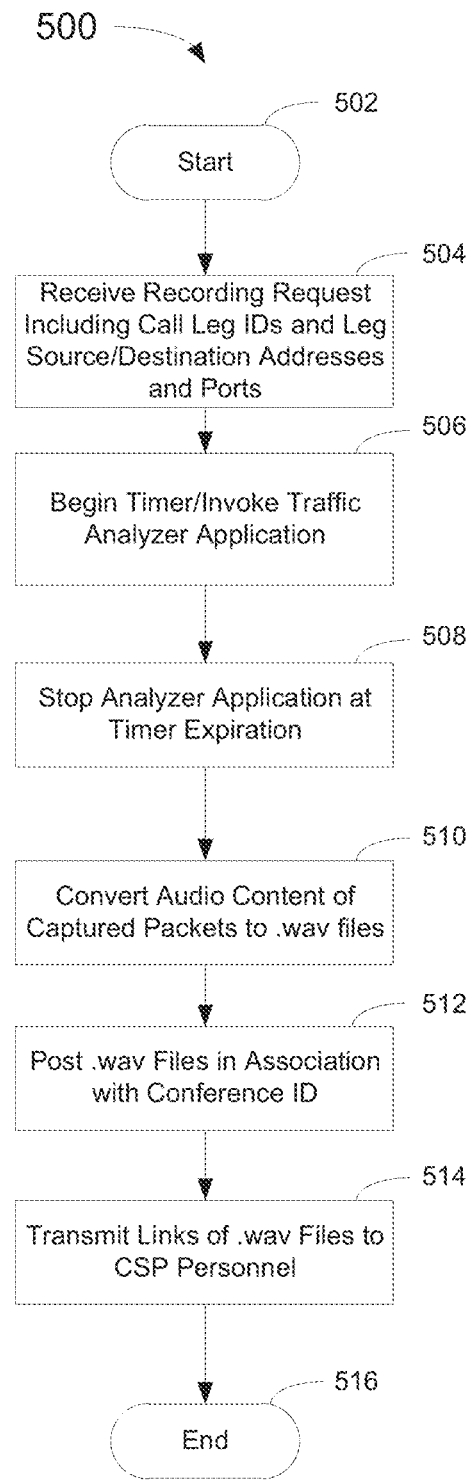
FIG. 5 is a flowchart depicting processing of a recording server routine for recording conference legs in accordance with an embodiment of the invention.

FIG. 5 is a flowchart depicting processing of a recording server routine for recording conference legs in accordance with an embodiment of the invention. The recording server routine is invoked (step 502), and a recording request is received from the application server (step 504). The recording request may include call leg IDs of call legs involved in the conference and associated source and destination addresses and ports of the call legs. The recording server may then invoke a traffic analyzer program and begin a session timer (step 506). The traffic analyzer program then begins capturing the RTP streams of the identified conference legs. The recorder server awaits expiration of the timer at which time the traffic analyzer application media capturing session is terminated for the conference legs (step 508). The audio content may then be retrieved from the packets of each captured conference leg, and the audio content may be converted to a .wav or other suitable file format for each conference leg (step 510). The .wav files may then be posted in association with the conference ID (step 512), and a link to the posted .wav files may then be transmitted to appropriate conference service provider (CSP) personnel (step 514). The recording server routine cycle may then end (step 516).

As described, a tap is deployed at the ingress side and the egress side of one or more processing systems that handle each leg of a conference. When a conference is disrupted by noise, loss, or the like, an operator may initiate a command to systemically record each leg of the conference for a predetermined period of time. Each leg may then be analyzed to determine if it is the source of the disruption. Advantageously, each recorded leg of the conference is transformed into an audible signal before it is analyzed. The quality of the audible signals at the ingress and egress sides of each processing system may be compared. If the problem cannot be isolated in this manner, then the audible signals can be easily transferred and analyzed by engineers. In this manner, a disruptive leg or legs of a conference call may be diagnosed and corrected in a cost-effective, minimally disruptive manner.

The flowcharts of FIGS. 4-5 depict process serialization to facilitate an understanding of disclosed embodiments and are not necessarily indicative of the serialization of the operations being performed. In various embodiments, the processing steps described in FIGS. 4-5 may be performed in varying order, and one or more depicted steps may be performed in parallel with other steps. Additionally, execution of some processing steps of FIGS. 4-5 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for diagnosing a conference call, comprising:
   deploying taps at an ingress port and egress port of a telecommunications node configured to aggregate conference legs;
   interfacing with the taps a recording system configured to systematically record real time transport of audio or video at the ingress port and the egress port when the conference call is disrupted;
   capturing, in response to receipt of a recording command, the real time transport at each leg of the conference identified in the recording command for a predefined period of time to determine a source of the disruption;
   transforming the captured real time transport for each leg of the conference into audio files; and
   providing the audio files comprising the captured real time transport for each leg of the conference to a conference system provider.

2. A computer program embodied on a non-transitory computer-readable medium, the computer program configured to cause a processor to:
   tap an ingress port and an egress port of a telecommunications node configured to aggregate conference legs;
   communicatively interface a recording system configured to systematically record real time transport of audio or video captured at the ingress port and the egress port when the conference call is disrupted;
   capture, in response to receipt of a recording command, the real time transport for each leg of the conference identified in the recording command for a predefined period of time to determine a source of the disruption;
   transform the captured real time transport for each leg of the conference into audio files; and
   provide the audio files comprising the captured real time transport for each leg of the conference to a conference system provider.

3. A system configured to diagnose a conference call, comprising:
   a plurality of terminal devices configured to participate in a conference call;
   a node configured to terminate a conference leg with each of the plurality of terminal devices at a respective port of the node;
   a respective tap deployed inline with each port terminating a conference leg; and a recording device configured to systematically capture real time transport of audio or video from each respective tap identified in a recording command when the conference call is disrupted, wherein the recording device is configured to capture real time transport for each leg of the conference for a predefined period of time to determine a source of the disruption when the recording command is received from a conference service provider operator, and transform the captured real time transport for each leg of the conference into audio files.

4. The system of claim 3, wherein the recording device provides a hyperlink referencing each respective audio file to a conference service provider personnel.

* * * * *